(12) United States Patent
Deb et al.

(10) Patent No.: US 9,171,171 B1
(45) Date of Patent: Oct. 27, 2015

(54) GENERATING A HEAT MAP TO IDENTIFY VULNERABLE DATA USERS WITHIN AN ORGANIZATION

(71) Applicant: EMC Corporation, Hopkinton, MA (US)

(72) Inventors: Shuva Brata Deb, Karnataka (IN); Anadi Madhukar, Karnataka (IN); Ramkumar Paranandi, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 127 days.

(21) Appl. No.: 13/795,619

(22) Filed: Mar. 12, 2013

(51) Int. Cl.
*G06F 21/55* (2013.01)
*G06F 21/60* (2013.01)
*H04L 29/06* (2006.01)

(52) U.S. Cl.
CPC ............... *G06F 21/60* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 7,975,286 B1 * | 7/2011 | Fickey et al. | 726/1 |
| 8,266,701 B2 * | 9/2012 | McConnell et al. | 726/25 |
| 8,800,045 B2 * | 8/2014 | Curtis et al. | 726/25 |
| 2004/0006704 A1 * | 1/2004 | Dahlstrom et al. | 713/200 |
| 2007/0061874 A1 * | 3/2007 | Coppola et al. | 726/10 |
| 2008/0104665 A1 * | 5/2008 | Naldurg et al. | 726/2 |

OTHER PUBLICATIONS

RSA, RSA DLP 9.6 Endpoint, Deployment Guide, Feb. 2013 EMC Corporation, pp. 1-86.
RSA, RSA DPL 9.6 Network, Deployment Guide, Feb. 2013 EMC Corporation, pp. 1-138.
RSA, RSA DPL 9.6 QuickStart, Feb. 2013 EMC Corporation, pp. 1-70.

* cited by examiner

*Primary Examiner* — Christopher Revak
(74) *Attorney, Agent, or Firm* — Ryan, Mason & Lewis, LLP

(57) ABSTRACT

Methods, apparatus and articles of manufacture for generating a heat map to identify vulnerable data users within an organization are provided herein. A method includes comparing each of one or more items of data against a set of one or more pre-configured data sensitivity parameters to detect one or more sensitive data operations within the one or more items of data, generating an alert corresponding to each of the one or more sensitive data operations, wherein the alert provides one or more items of information pertaining to the corresponding sensitive data operation, and processing the one or more alerts to generate a heat map representing an association between each of multiple users and the one or more sensitive data operations usage.

20 Claims, 7 Drawing Sheets

*FIG. 5*

```
502
<?xml version="1.0" encoding="UTF-8"?>
<mini-event>
    <user>user@organization.com</user>
    <content_match_list>
        <content_match>
            <category>Credit Card</category>
            <severity>30</severity>
        </content_match>
    </content_match_list>
    <time>2012-06-14T16:37:10Z</time>
    <application>firefox.exe</application>
</mini-event>
```

US 9,171,171 B1

GENERATING A HEAT MAP TO IDENTIFY VULNERABLE DATA USERS WITHIN AN ORGANIZATION

FIELD

The field relates generally to information technology, and more particularly to data security.

BACKGROUND

Attackers, for example, in an advanced persistent threat (APT), commonly perform reconnaissance on a target organization prior to attempted exploitation. Through this reconnaissance, the attackers may identify individuals of interest and/or develop methods of potential access to the target. Targeted individuals can range, for example, from senior leadership to researchers to administrative assistants. The individuals and/or user accounts in an organization that use and/or have access to sensitive data are logically the individuals whose leak and/or loss would cause the most significant negative impact for the organization. It would therefore be advantageous to preemptively identify individuals within the organization that possess particular vulnerability with respect to data usage and/or access.

SUMMARY

One or more illustrative embodiments of the present invention provide techniques for generating a heat map to identify vulnerable data users within an organization.

In accordance with an aspect of the invention, a method is provided comprising the steps of comparing each of one or more items of data against a set of one or more pre-configured data sensitivity parameters to detect one or more sensitive data operations within the one or more items of data, generating an alert corresponding to each of the one or more sensitive data operations, wherein the alert provides one or more items of information pertaining to the corresponding sensitive data operation, and processing the one or more alerts to generate a heat map representing an association between each of multiple users and the one or more sensitive data operations.

In accordance with another aspect of the invention, a method is provided comprising the steps of comparing each of one or more items of monitored data against a set of one or more pre-configured data sensitivity parameters to detect one or more sensitive data operations within the one or more items of monitored data, and generating an alert corresponding to each of the one or more sensitive data operations, wherein the alert provides one or more items of information pertaining to the corresponding sensitive data operation. This method further comprises the steps of processing the one or more alerts to generate a heat map representing an association between each of multiple users within an organization and the one or more sensitive data operations, and implementing a security policy for the organization based on the heat map.

The data security techniques of the illustrative embodiments overcome one or more of the problems associated with the conventional techniques described previously. These and other features and advantages of the present invention will become more readily apparent from the accompanying drawings and the following detailed description.

BRIEF DESCRIPTION OF THE DRAWINGS

FIG. 5 is a diagram illustrating an example mini-event, according to an embodiment of the invention;

DETAILED DESCRIPTION

Figure 1:
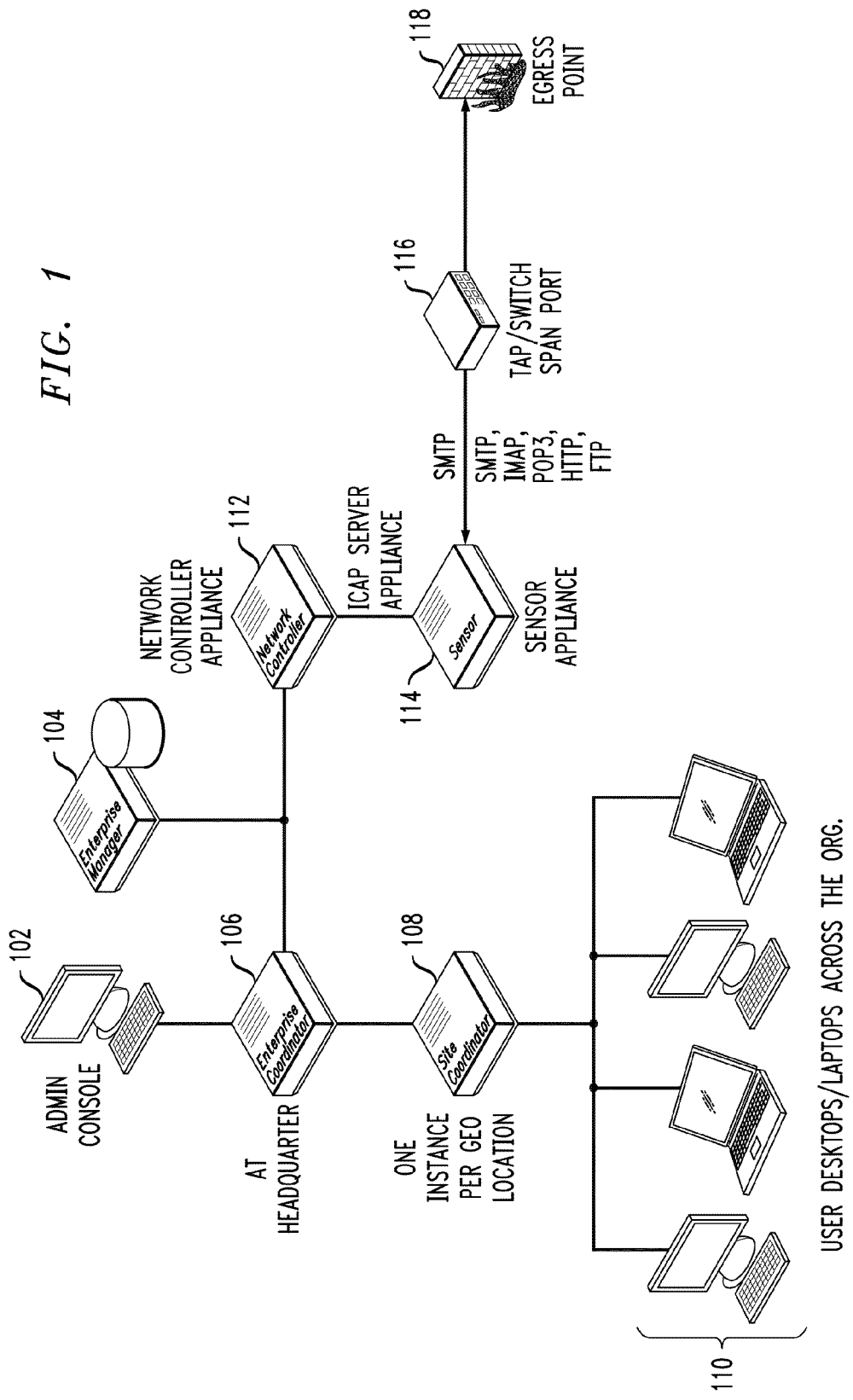
FIG. 1 is a diagram illustrating example system components, according to an embodiment of the invention.

As will be described, the present invention, in one or more illustrative embodiments, provides techniques for generating a heat map to preemptively identify and represent vulnerable users handling sensitive data within an organization. At least one embodiment of the invention includes generating alerts (also referred to herein as mini-events) for all sensitive data detections, irrespective of data loss prevention (DLP) policies. Such alerts can be accumulated in a central repository or database and used to generate a heat map. As detailed herein, such a heat map can be used, for example, as input to network security monitoring platforms, and/or to build a business case (for instance, to focus a security budget on particular individuals). A generated heat map can also be used for creating and/or enforcing customized security policies on particularly vulnerable individuals.

Illustrative embodiments of the present invention will be described herein with reference to exemplary communication systems and/or processing devices. It is to be appreciated, however, that the invention is not restricted to use with the particular illustrative system and device configurations shown.

A DLP system such as implemented in connection with at least one embodiment of the invention includes visibility into user data transactions on laptops and desktops, as well as visibility into network traffic. Such a system covers both data-in-use and data-in-motion. Accordingly, an aspect of the invention includes monitoring all data-in-use (for example, desktop applications) and data-in-motion (for example, network traffic) and generating a heat map of data users.

As noted herein, generating alerts for all sensitive data detections, irrespective of DLP policies, can cause the alerts to be accumulated to a central repository without the need for significant design changes in many DLP products. Also, in at least one embodiment of the invention, such alerts include a user identifier (ID), a descriptive element as to the nature of the sensitivity of the associated data, and the time of the alert. Based on this accumulation of alerts, at least one embodiment of the invention includes generating a heat map of users that handle a non-trivial amount of sensitive data.

At least one embodiment of the invention includes utilizing existing DLP architecture and corresponding deployment across an organization, as well as utilizing existing monitoring capabilities and definitions of sensitive data. Accordingly, the definition of what constitutes "sensitive" data can be determined and/or established by relevant DLP policies in the form of content blades, and/or user-defined content blades.

By way of example, a system might include a source code content blade, a finger printed content blade, etc.

Content blades are components that encapsulate the rules and logic dedicated to be used for detecting a specific piece of content (such as, for example, a credit card number). By way of example, a content blade can utilize detection rules and/or contextual rules. Detection rules can include rules that address questions such as, "What is in the documents or transmissions?" If the document contains a personal identification number, for instance, then the document might be sensitive. The context rules leverage contextual evidence and address questions such as, "How does the evidence appear in the documents?" If the document contains a personal identification number, for instance, is that information near a name or an address? Once defined, the content blade can be re-used across any number of policies.

Further, detection rules in a content blade can be grouped into rules of inclusion and rules of exclusion. Rules of inclusion include positive detection rules, wherein such rules describe evidence that should be contained in a document. Rules of inclusion can be required "Must Occur" rules or optional "May Occur" rules. Rules of exclusion include negative detection rules, wherein such rules describe evidence that should not be contained in a document. These rules may also be referred to as "Should Not Occur" rules. In at least one embodiment of the invention, rules of exclusion are only used in conjunction with rules of inclusion. Additionally, rules of exclusion can be used to eliminate matching on specific evidence that is causing a false positive match.

Further, in at least one embodiment of the invention, matches to rules of exclusion are compared to matches of the rules of inclusion, and if the total score is higher for the rules of exclusion, that document will not be a match to the content blade. For example, a rule of exclusion may be used to stop falsely matching a training document on credit card numbers, which contains valid card numbers and words and phrases. The rule of exclusion may discount the document as a match based on the document's title or other linguistic evidence.

By way of illustration, consider the follow example scenarios for implementation of the techniques detailed herein. An organization, based on determinations derived from a generated heat map, identifies multiple assistants of senior executives who access sensitive data. As a result, the organization may opt, for example, to implement a policy requiring the noted assistants to change relevant passwords at a given interval (for example, every week, or every month), or to enforce more protection around these employees while developing a custom security policy.

FIG. 1 is a diagram illustrating example system components, according to an embodiment of the invention. By way of illustration, FIG. 1 depicts components of a DLP system implemented in monitoring user activity in accordance with at least one embodiment of the invention. Specifically, FIG. 1 depicts an administrator (admin) console 102, an enterprise manager component 104 (which can include an enterprise results database), an enterprise coordinator component 106 (which can reside at an enterprise headquarter location, for example), a site coordinator component 108 (for example, one instance per geographic location) and a set of devices 110 such as user desktops and/or laptops across the organization. FIG. 1 also depicts a network controller appliance 112, a sensor appliance 114, a tap and/or switch span port component 116 and an egress point 118.

In FIG. 1, all data being used by the desktop and laptops 110 are monitored. For example, in at least one embodiment of the invention, a signed kernel module and a dynamic-link library (DLL) are injected into all processes on the user desktop/laptops 110 by a DLP end-point agent. The signed kernel module makes sure that the DLL gets injected into processes as and/or when the processes are launched. The injected DLL, in turn, is responsible for intercepting system-level application programming interface (API) calls made by an application to monitor the application for potential security violations. Every item of data activity on the laptop or desktop (from set 110) that relates to sensitive data can be mapped to the user and/or user account associated with that laptop or desktop.

As also depicted in FIG. 1, sensor 114 is an appliance which monitors several protocols in connection with analyzing data moving within the organization and/or moving out of the organization. Similarly, the sensor 114 additionally monitors network protocols in analyzing network traffic coming in and/or going out of the organization. The sensor 114 is further capable of mapping the network traffic to individual data users.

DLP is designed to be scalable, with dispersed and parallel execution of its tasks. Accordingly, as illustrated in FIG. 1, content analysis is handled by end-point agents on the user desktop/laptops 110 and sensors 114 that perform the analysis in place. Each end-point agent receives instructions from, and returns results to, its site coordinator component 108, which manages agents for a local network. For example, an enterprise installation can have as many site coordinators as is desired, possibly in dispersed locations.

The enterprise coordinator component 106 is the controller of all site coordinator components 108 deployment. The enterprise coordinator component 106 sends instructions to, and gathers results from, all site coordinator components 108. The network controller component 112 is the controller of all sensors 114. Accordingly, the network controller component 112 sends instructions to, and gathers results from all sensors 114.

Additionally, the enterprise manager component 104 is the administrative interface and management console for all DLP components. Further, the admin console 102 is a representation of the user interface (UI) component of the enterprise manager component 104.

As detailed herein, the components depicted in FIG. 1 can be implemented in connection with data-in-use flows as well as with data-in-motion flows. With respect to data-in-use flows, sensitive content usage is detected by the end-point agents on the user desktop/laptops 110. The evidence of sensitive data transmission is logged, and this log reaches the enterprise manager component 104 through the site coordinator component 108 and enterprise coordinator component 106.

With respect to data-in-motion flows, network transmission of sensitive data is detected by the sensor 114 as the sensor 114 is reading network data transmissions via the tap/switch span port 116. The tap 116 is monitoring all transmission at the egress point 118. Further, the evidence of sensitive data transmission is logged, and this log reaches the enterprise manager 104 through the network controller 112.

Figure 2:
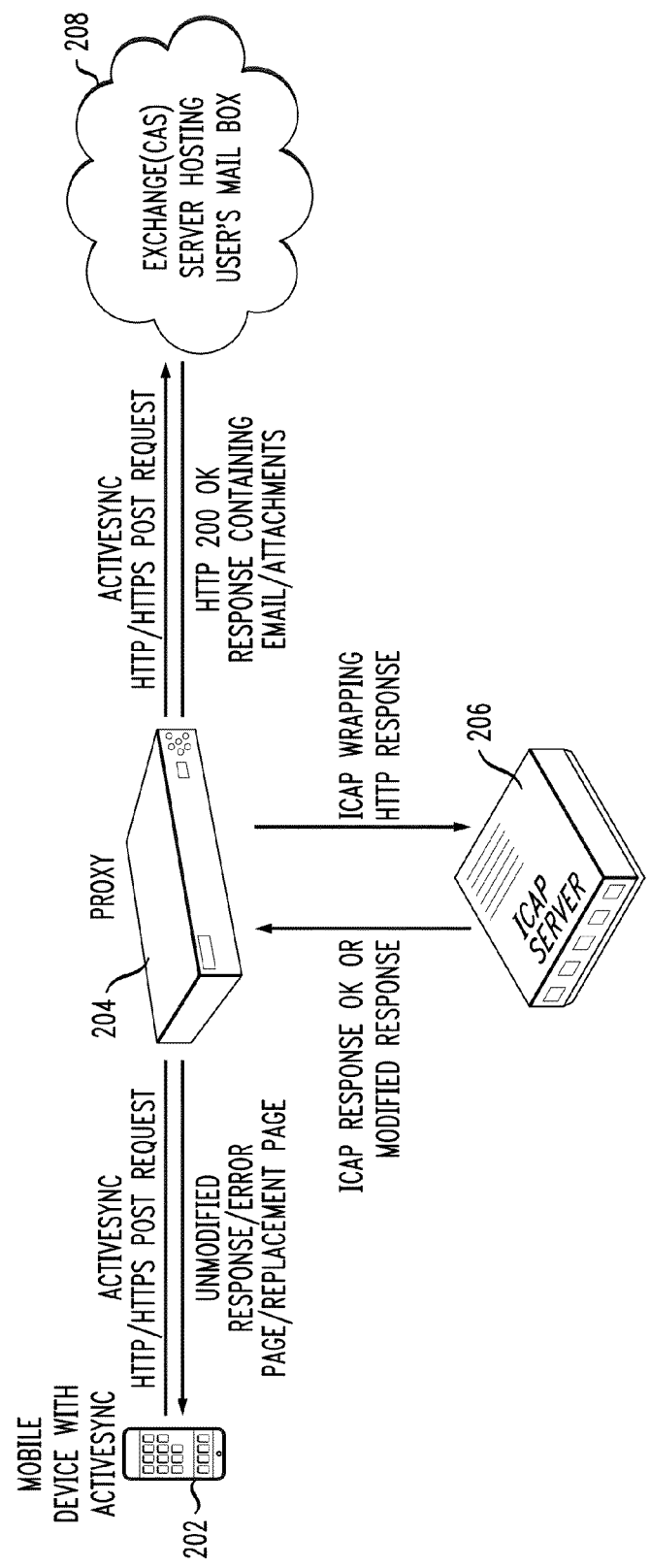
FIG. 2 is a diagram illustrating example system components, according to an embodiment of the invention.

FIG. 2 is a diagram illustrating example system components, according to an embodiment of the invention. By way of illustration, FIG. 2 depicts a deployment wherein internal organization emails are monitored in an organization using DLP. Specifically, FIG. 2 depicts a mobile device 202 (such as, for example, a smart phone) with a data synchronization application (such as, for example, ActiveSync from Microsoft®) residing outside of a corporate network syncing data using the data synchronization application protocol with an exchange server 208 hosting user's mail box and running behind a web proxy device 204. The web proxy 204 is configured in reverse proxy mode and is configured to an internet content adaptation protocol (ICAP) server 206 in response modification mode.

As illustrated in FIG. 2, a synchronization (sync) request from the mobile device 202 is sent as hypertext transfer protocol (HTTP) or hypertext transfer protocol secure (HTTPS) POST to exchange server 208. The response to that request contains data (such as, for example, email data, calendar data, short messaging service (SMS) data, a meeting request or other information related to device-based policy settings) from the exchange server 208. All of the responses being transmitted through proxy 204 are sent to ICAP server 206 for content analysis. Based on the configured DLP settings, the ICAP server 206 will audit the sensitive data in the response before the response is sent to the mobile device 202.

Accordingly, a user accessing data using his/her mobile device 202 is being monitored for sensitive data usage via the ICAP server 206. As such, sensitive data can be mapped to a particular user based on this monitoring.

Figure 3:
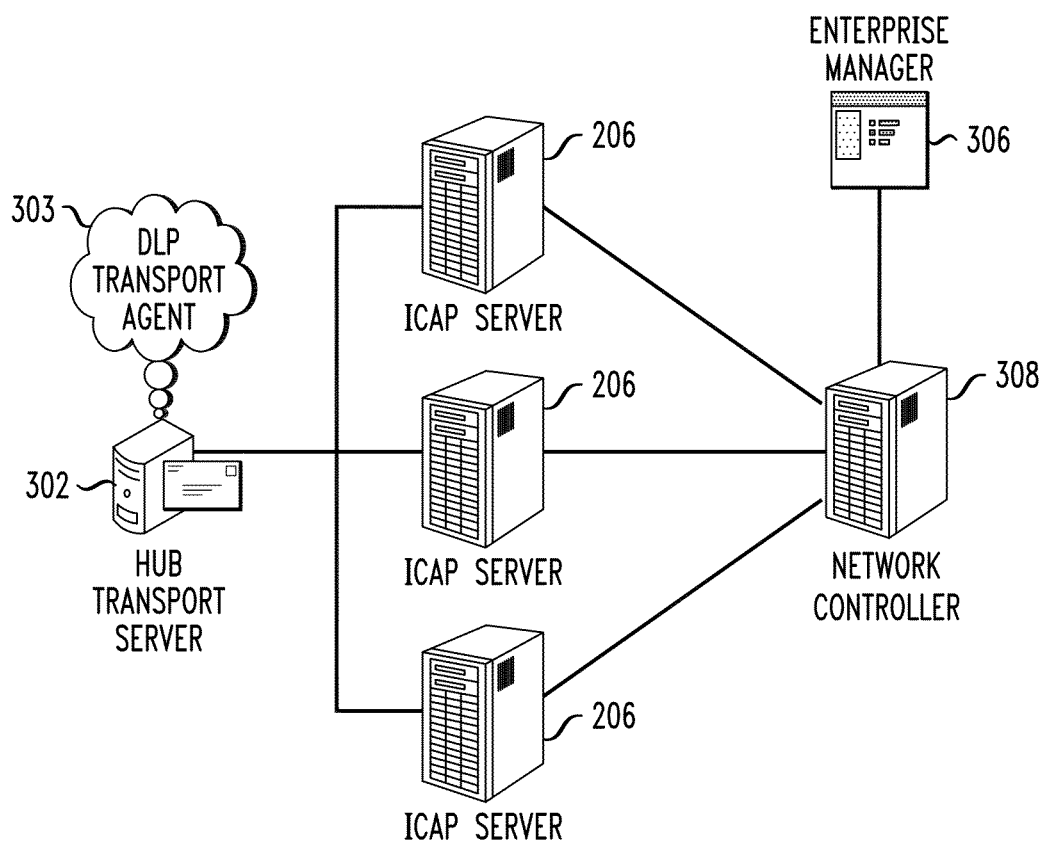
FIG. 3 is a diagram illustrating example system components, according to an embodiment of the invention.

The same ICAP server 206 can be used for monitoring internal emails in conjunction with a DLP exchange agent, as shown in FIG. 3, which is a diagram illustrating example system components, according to an embodiment of the invention. Specifically, in FIG. 3, a hub transport server 302 is a component of an exchange server (such as, for example, the Microsoft® Exchange server). Additionally, FIG. 3 depicts an enterprise manager component 306, as well as a network controller 308. As noted above, the network controller 308 functions in a similar manner to the network controller (112) depicted in FIG. 1; that is, the network controller 308 manages all of the sensors, or in this instance, the ICAP servers 206. Additionally, the enterprise manager component 306, similar to the enterprise manager component (104) depicted in FIG. 1, functions as the administrative interface and management console for all DLP components.

In connection with the hub transport server 302, the DLP transport agent 303 has the capability to monitor all internal email transactions to detect sensitive data usage and map each usage to a user. In at least one embodiment of the invention, the DLP transport agent 303 can include a software component that works as a plug-in into the hub transport serer 302 (which can be a component of an exchange server).

As noted above, existing approaches utilizing DLP capabilities include monitoring but provide reporting only if a policy violation is detected. That is, in such approaches, if a given transaction or data operation involves legitimate usage of sensitive data, that transaction or data operation is not reported. However, aspects of the present invention include reporting all detected events associated with sensitive data usage, and leveraging this reporting information to generate a heat map representing user vulnerability with respect to sensitive data access and/or usage.

Figure 4:
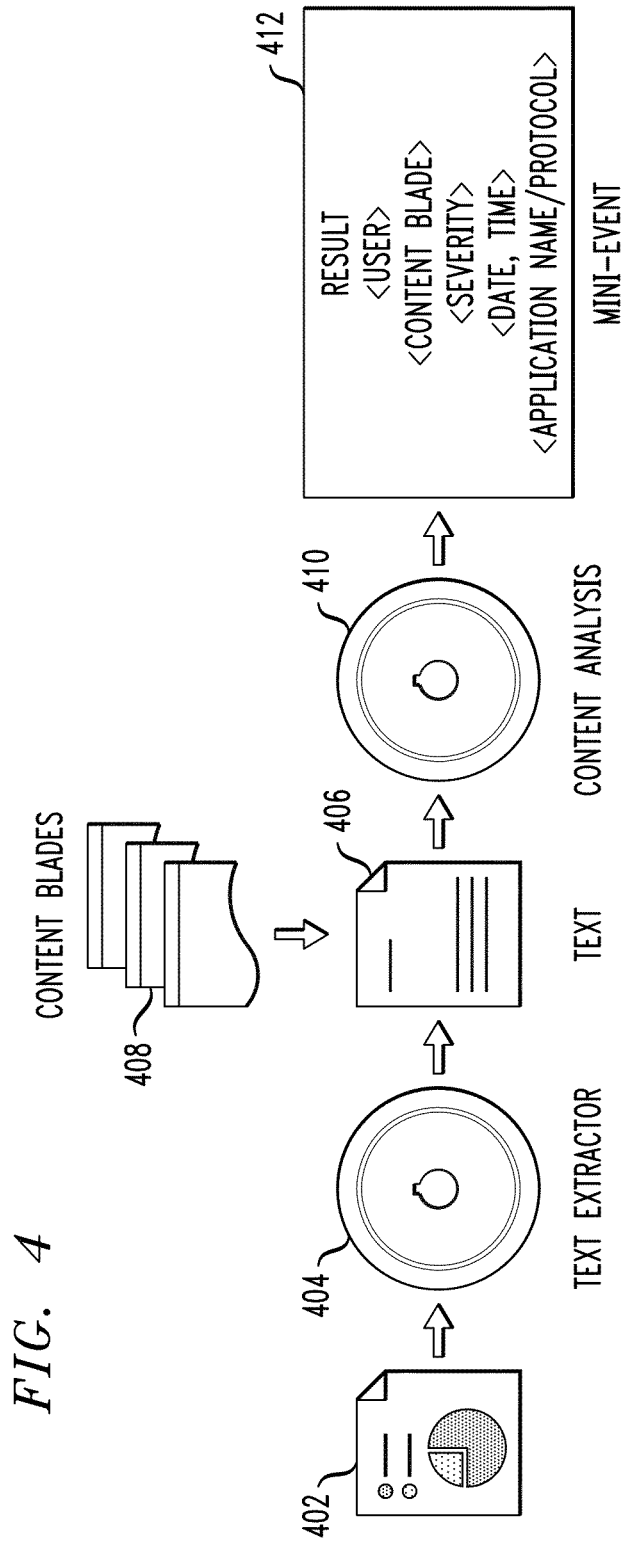
FIG. 4 is a diagram illustrating analysis of content leading to detection of a sensitive data flow, according to an embodiment of the invention.

FIG. 4 is a diagram illustrating analysis of content leading to detection of a sensitive data flow, according to an embodiment of the invention. As depicted in FIG. 4, a data file 402 is processed by a text extractor component 404, which extracts selected text 406 from the data file 402. The extracted text 406 is processed by a content analysis component 410 based on parameters set forth in configured DLP-defined content blades 408, wherein such processing generates a mini-event 412 (also referred to herein as an alert).

In at least one embodiment of the invention, a mini-event includes information such as the name (or other identifying information) of the user who performed the data operation associated with data file 402, as well as the specific content blade(s) (from the set of content blades 408) implicated in the sensitive data detection flow, indicating the category of sensitive data involved in the data operation. A mini-event can additionally include information such as the severity (for example, as represented by a scale of 1-100) of the sensitive data and/or associated data operation. In at least one embodiment of the invention, the logic for determining severity is defined in the content blades 408. The content analysis component 410 performs the action of assigning severity for the data analyzed.

Further, in at least one embodiment of the invention, a mini-event can also include information such as the time that the relevant data operation occurred, as well as the application name and/or the network protocol involved in the data operation.

FIG. 5 is a diagram illustrating an example min-event 502, according to an embodiment of the invention. Similar to the descriptions above, the example mini-event 502 depicted in FIG. 5 includes identification of the user via a user email address, identification of the category of sensitive data involved in the data operation ("Credit Card"), an associated severity score of 30, the date and time of the data operation ("2012-06-14T16:37:10Z"), and the application involved in the data operation ("firefox.exe"). In at least one embodiment of the invention, mini-events such as example 502 are collected from sensors (such as component 114, as depicted in FIG. 1) within the organization as well all user-machines and/or devices, and the mini-events are stored in a database (such as the enterprise manager database 104, as depicted in FIG. 1). A database job processes the stored mini-events to generate a heat map of the users, such as the example illustrated in FIG. 6.

The logic of determining and generating the heat map involves aggregation on the "severity" parameter and sorting on the "user" parameter. By way of example, if user@organization.com (as identified in the mini-event 502 in FIG. 5) sends 100 emails with high severity, then there would be 100 mini-events which will be aggregated on the severity parameter. This user's total severity value will be sorted against other users' severity value to determine his/her position on the heat map.

Figure 6:
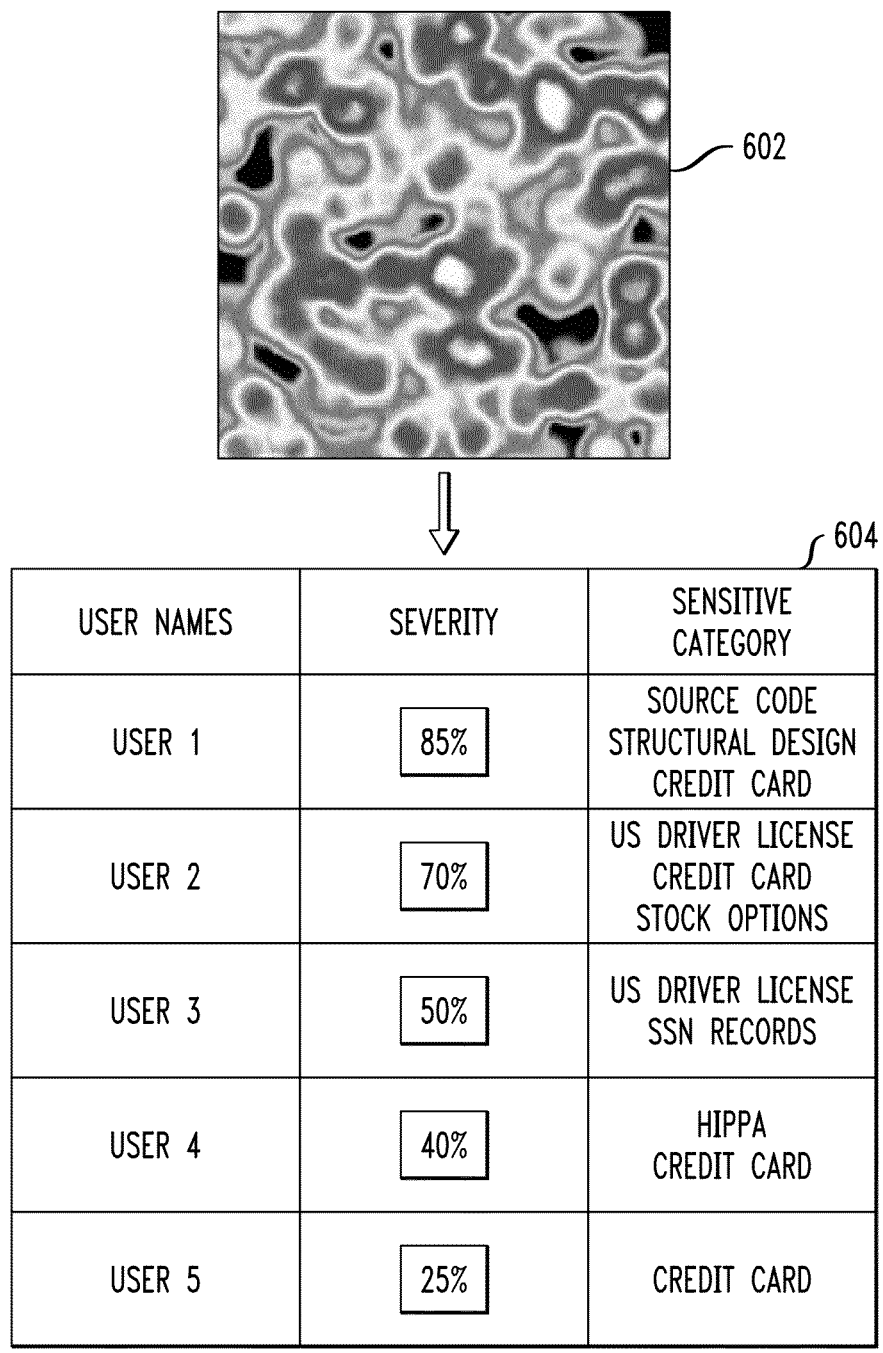
FIG. 6 is a diagram illustrating an example heat map and a corresponding example heat map report, according to an embodiment of the invention.

Accordingly, FIG. 6 is a diagram illustrating an example heat map 602 and a corresponding example heat map report 604, according to an embodiment of the invention. As depicted in the example report 604 in FIG. 6, such reports can include the identification of particular users within the organization, as well as severity scores and sensitive data categories associated with the data operation(s) of those particular users. The report content is derived from the heat map, generated as detailed above via aggregation on a "severity" parameter and sorting on a "user" parameter.

Figure 7:
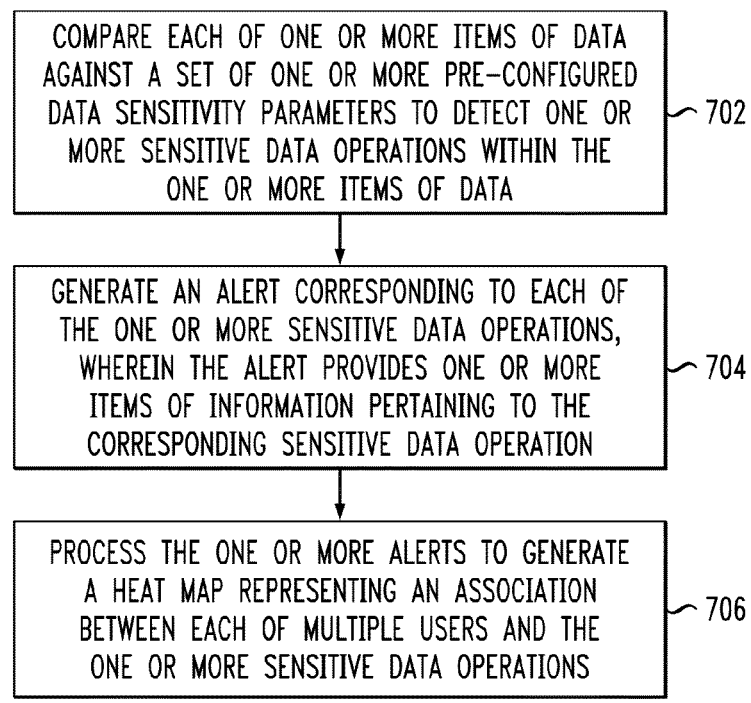
FIG. 7 is a flow diagram illustrating techniques according to an embodiment of the present invention.

FIG. 7 is a flow diagram illustrating techniques according to an embodiment of the present invention. Step 702 includes comparing each of one or more items of data against a set of one or more pre-configured data sensitivity parameters to detect one or more sensitive data operations within the one or more items of data. The data can include data-in-use (for example, desktop applications and/or laptop applications) as well as data-in-motion (for example, network traffic). At least one embodiment of the invention also includes monitoring one or more items of data within an organization. The pre-configured data sensitivity parameters can include configured DLP policy-defined content blades, and/or user-defined content blades.

Step 704 includes generating an alert corresponding to each of the one or more sensitive data operations, wherein the alert provides one or more items of information pertaining to the corresponding sensitive data operation. As detailed herein, the alert can include information identifying a user who performed the corresponding sensitive data operation, information identifying a pre-configured data sensitivity parameter implicated in said comparing step, as well as information identifying a pre-configured data sensitivity parameter implicated in said comparing step comprises information indicating a category of sensitive data involved in the sensitive data operation. The alert can also include a severity measure associated with the corresponding sensitive data operation, information identifying a time that the corresponding sensitive data operation occurred, and information identifying at least one of an application and a network protocol involved in the sensitive data operation. At least one embodiment of the invention also includes storing each alert in a database.

Step 706 includes processing the one or more alerts to generate a heat map representing an association between each of multiple users and the one or more sensitive data operations. At least one embodiment of the invention additionally includes generating a report corresponding to the heat map. The report can include information identifying one or more users associated with one or more sensitive data operations, a severity measure associated with each of the one or more sensitive data operations, and a sensitive data category associated with each of the one or more sensitive data operations.

Further, at least one embodiment of the invention includes implementing a security policy based on the heat map. The security policy can include, for example, a requirement for one or more users to change one or more user passwords at a given interval.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and configured to perform the techniques detailed herein. Also, as described herein, aspects of the present invention may take the form of a computer program product embodied in a computer readable medium having computer readable program code embodied thereon.

Figure 8:
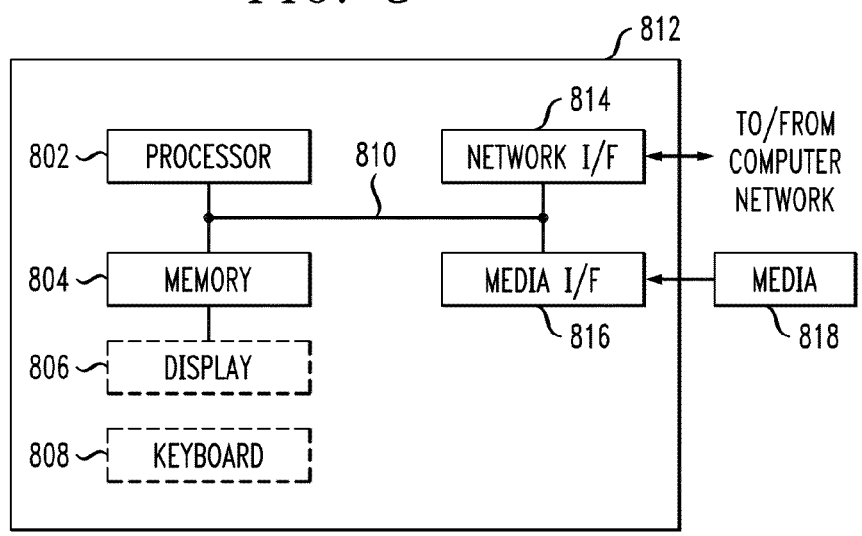
FIG. 8 is a system diagram of an exemplary computer system on which at least one embodiment of the invention can be implemented.

By way of example, an aspect of the present invention can make use of software running on a general purpose computer. As noted above, FIG. 8 is a system diagram of an exemplary computer system on which at least one embodiment of the invention can be implemented. As depicted in FIG. 8, an example implementation employs, for example, a processor 802, a memory 804, and an input/output interface formed, for example, by a display 806 and a keyboard 808. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 802, memory 804, and input/output interface such as display 806 and keyboard 808 can be interconnected, for example, via bus 810 as part of a data processing unit 812. Suitable interconnections via bus 810, can also be provided to a network interface 814 (such as a network card), which can be provided to interface with a computer network, and to a media interface 816 (such as a diskette), which can be provided to interface with media 818.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 808, displays 806, and pointing devices, can be coupled to the system either directly (such as via bus 810) or through intervening I/O controllers.

Network adapters such as network interface 814 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 812 as depicted in FIG. 8) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM or Flash memory), an optical fiber, a portable compact disc read-only memory (CD-ROM), an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

It should again be emphasized that the above-described embodiments of the invention are presented for purposes of illustration only. Many variations and other alternative embodiments may be used. For example, the techniques are applicable to a wide variety of other types of communication systems and cryptographic devices that can benefit from data security techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
   comparing each of one or more items of data against a set of one or more pre-configured data sensitivity parameters to detect one or more sensitive data operations that have been carried out by one or more of multiple users within the one or more items of data;
   generating an alert corresponding to each of the one or more sensitive data operations, wherein the alert provides one or more items of information pertaining to the corresponding sensitive data operation comprising at least a severity measure associated with the corresponding sensitive data operation; and processing the one or more alerts to generate a heat map, wherein said heat map comprises a visualization representing a level of association between each of the multiple users and the one or more sensitive data operations, relative to each of the remaining multiple users, to identify the one or more of the multiple users that have carried out the one or more operations on sensitive data, wherein said association corresponds to a given period of time, and wherein said generating the heat map comprises:

aggregating, for each of the multiple users, the severity measure associated with the one or more sensitive data operations; and sorting the aggregated severity measure of each of the multiple users against the aggregated severity measure of each of the remaining multiple users to determine a position of each of the multiple users on the heat map.

2. The method of claim 1, further comprising:
monitoring one or more items of data within an organization.

3. The method of claim 1, wherein said one or more items of data comprises one or more items of data-in-use.

4. The method of claim 3, wherein said one or more items of data-in-use comprises at least one of a desktop application and a laptop application.

5. The method of claim 1, wherein said one or more items of data comprises one or more items of data-in-motion.

6. The method of claim 5, wherein said one or more items of data-in-motion comprises network traffic.

7. The method of claim 1, wherein said set of one or more pre-configured data sensitivity parameters comprise one or more configured data loss prevention policy-defined content blades.

8. The method of claim 1, wherein said set of one or more pre-configured data sensitivity parameters comprise one or more user-defined content blades.

9. The method of claim 1, wherein said alert comprises information identifying a user who performed the corresponding sensitive data operation.

10. The method of claim 1, wherein said alert comprises information identifying a pre-configured data sensitivity parameter implicated in said comparing step.

11. The method of claim 10, wherein said information identifying a pre-configured data sensitivity parameter implicated in said comparing step comprises information indicating a category of sensitive data involved in the sensitive data operation.

12. The method of claim 1, wherein said alert comprises information identifying a time that the corresponding sensitive data operation occurred.

13. The method of claim 1, wherein said alert comprises information identifying at least one of an application and a network protocol involved in the sensitive data operation.

14. The method of claim 1, further comprising:
storing each alert in a database.

15. The method of claim 1, further comprising:
generating a report corresponding to the heat map, wherein said report comprises information identifying one or more users associated with one or more sensitive data operations, a severity measure associated with each of the one or more sensitive data operations, and a sensitive data category associated with each of the one or more sensitive data operations.

16. An article of manufacture comprising a non-transitory processor-readable storage medium having processor-readable instructions tangibly embodied thereon which, when implemented, cause a processor to carry out steps comprising:

comparing each of one or more items of data against a set of one or more pre-configured data sensitivity parameters to detect one or more sensitive data operations that have been carried out by one or more of multiple users within the one or more items of data;

generating an alert corresponding to each of the one or more sensitive data operations, wherein the alert provides one or more items of information pertaining to the corresponding sensitive data operation comprising at least a severity measure associated with the corresponding sensitive data operation; and processing the one or more alerts to generate a heat map, wherein said heat map comprises a visualization representing a level of association between each of the multiple users and the one or more sensitive data operations, relative to each of the remaining multiple users, to identify the one or more of the multiple users that have carried out the one or more operations on sensitive data wherein said association corresponds to a given period of time, and wherein said generating the heat map comprises:

aggregating, for each of the multiple users, the severity measure associated with the one or more sensitive data operations; and sorting the aggregated severity measure of each of the multiple users against the aggregated severity measure of each of the remaining multiple users to determine a position of each of the multiple users on the heat map.

17. An apparatus comprising:
a memory; and
at least one processor coupled to the memory and configured to:

compare each of one or more items of data against a set of one or more pre-configured data sensitivity parameters to detect one or more sensitive data operations that have been carried out by one or more of multiple users within the one or more items of data;

generate an alert corresponding to each of the one or more sensitive data operations, wherein the alert provides one or more items of information pertaining to the corresponding sensitive data operation comprising at least a severity measure associated with the corresponding sensitive data operation; and process the one or more alerts to generate a heat map, wherein said heat map comprises a visualization representing a level of association between each of the multiple users and the one or more sensitive data operations, relative to each of the remaining multiple users, to identify the one or more of the multiple users that have carried out the one or more operations on sensitive data, wherein said association corresponds to a given period of time, and wherein said generating the heat map comprises:

aggregating, for each of the multiple users, the severity measure associated with the one or more sensitive data operations; and sorting the aggregated severity measure of each of the multiple users against the aggregated severity measure of each of the remaining multiple users to determine a position of each of the multiple users on the heat map.

18. A method comprising:

comparing each of one or more items of monitored data against a set of one or more pre-configured data sensitivity parameters to detect one or more sensitive data operations that have been carried out by one or more of multiple users within an organization within the one or more items of monitored data;

generating an alert corresponding to each of the one or more sensitive data operations, wherein the alert provides one or more items of information pertaining to the corresponding sensitive data operation comprising at least a severity measure associated with the corresponding sensitive data operation;

processing the one or more alerts to generate a heat map, wherein said heat map comprises a visualization representing a level of association between each of the multiple users and the one or more sensitive data operations, relative to each of the remaining multiple users, to identify the one or more of the multiple users that have carried out the one or more operations on sensitive data, wherein said association corresponds to a given period of time, and wherein said generating the heat map comprises:

aggregating, for each of the multiple users, the severity measure associated with the one or more sensitive data operations; and sorting the aggregated severity measure of each of the multiple users against the aggregated severity measure of each of the remaining multiple users to determine a position of each of the multiple users on the heat map; and implementing a security policy for the organization based on the heat map, wherein said security policy is applicable to one or more given users within the organization based on the heat map.

19. The method of claim 18, wherein said security policy comprises a requirement for one or more users to change one or more user passwords at a given interval.

20. An article of manufacture comprising a non-transitory processor-readable storage medium having processor-readable instructions tangibly embodied thereon which, when implemented, cause a processor to carry out steps comprising:

comparing each of one or more items of monitored data against a set of one or more pre-configured data sensitivity parameters to detect one or more sensitive data operations that have been carried out by one or more of multiple users within an organization within the one or more items of monitored data;

generating an alert corresponding to each of the one or more sensitive data operations, wherein the alert provides one or more items of information pertaining to the corresponding sensitive data operation comprising at least a severity measure associated with the corresponding sensitive data operation;

processing the one or more alerts to generate a heat map, wherein said heat map comprises a visualization representing a level of association between each of the multiple users and the one or more sensitive data operations, relative to each of the remaining multiple users, to identify the one or more of the multiple users that have carried out the one or more operations on sensitive data, wherein said association corresponds to a given period of time, and wherein said generating the heat map comprises:

aggregating, for each of the multiple users, the severity measure associated with the one or more sensitive data operations; and sorting the aggregated severity measure of each of the multiple users against the aggregated severity measure of each of the remaining multiple users to determine a position of each of the multiple users on the heat map; and implementing a security policy for the organization based on the heat map, wherein said security policy is applicable to one or more given users within the organization based on the heat map.

* * * * *